Sept. 23, 1941.         C. O. IVERSON         2,256,676
FLEXIBLE STEEL RULE GAUGE
Filed Dec. 31, 1940
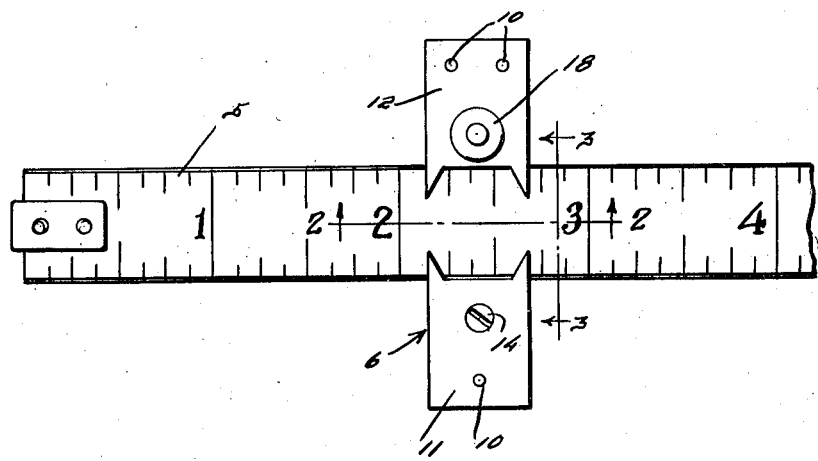
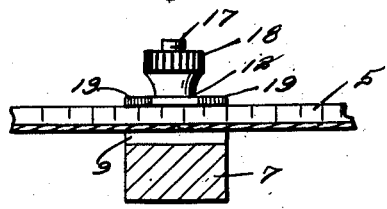
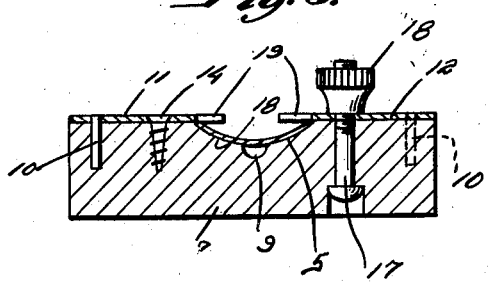
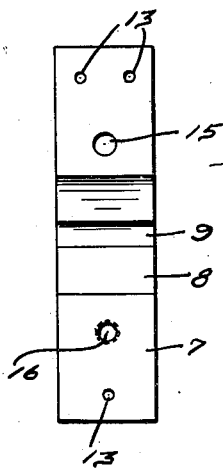
Inventor
Carl O. Iverson
By *Clarence A. O'Brien*
Attorney Patented Sept. 23, 1941

2,256,676

UNITED STATES PATENT OFFICE 2,256,676

FLEXIBLE STEEL RULE GAUGE

Carl O. Iverson, Longview, Wash.

Application December 31, 1940, Serial No. 372,664

2 Claims. (Cl. 33—173)

The present invention relates to new and useful improvements in gauges and more particularly to a slide gauge for flexible steel rules.

The principal object of the present invention is to provide a gauge which can be readily applied to a flexible steel rule and which is adapted to be slid to any desired graduation and there firmly secured against accidental adjustment.

Other objects and advantages of the invention will become apparent to the reader of the following specification.

In the drawing:

Figure 1 represents a fragmentary top plan view of a flexible steel rule with the gauge applied thereto.

Figure 2 is a fragmentary detailed sectional view taken substantially on a line 2—2 of Figure 1.

Figure 3 is a cross sectional view taken substantially on a line 3—3 of Figure 1.

Figure 4 is a top plan view of the gauge block with the plate removed.

Referring to the drawing, wherein like numerals designate like parts, it can be seen that numeral 5 denotes a flexible steel rule of the rollable type and which is usually of transverse curvature.

The gauge comprising the present invention is generally referred to by numeral 6.

The gauge is composed of a block 7 of rectangular shape and having an arcuate-shaped cutout 8 in the intermediate portion of its top. A small groove 9 is provided across the bottom of the cut-out 8.

Rising from each end portion of the block 7 are pins 10 which project into openings in plates 11 and 12. Of course, these pins 10 can be carried by the gauge plates 11 and 12 and depend into openings 13 in the block 7.

The gauge plate 11 has an opening therein for receiving a wood screw 14 which is driven into an opening 15 in the block 7, while the plate 12 has an opening therein registrable with the opening 16 in the block 7 to accommodate a bolt 17. A knurled nut 18 is provided on the upper portion of this bolt 17 and can be screwed downwardly to bind against the plate 12. Obviously, the pointer protruding portions 19 project over the edge portions of the rule 5 and the rule is free to be moved in the cut-out 8 under the projections 19 when the nut 18 is in loosened position. However, when the nut 18 is tightened down onto the plate 12, the rule is clamped against the bottom of the cut-out 8 and between the pointer projections 19.

Obviously, the gauge in conjunction with the rule can be used as either an outside or inside caliper.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is—

1. A gauge for flexible steel rules comprising a block having a depression therein through which a flexible steel rule is movable, plates on the block having portions projecting over the edge portions of the rule and means for tightening and loosening one of the plates with respect to the corresponding edge of the rule.

2. A gauge for flexible steel rules comprising a block having an arcuate depression therein through which a flexible steel rule is movable with its edge portions at the top of the depression, plates on the block having portions projecting over the edges of the rule and means for tightening and loosening one of the plates with respect to the corresponding edge of the rule, said means consisting of a bolt extending through the block and the last-mentioned plate and provided with a nut on the plate end of the same.

CARL O. IVERSON.